C. METZLER.
DENTAL WASTE RECEIVER.
APPLICATION FILED OCT. 19, 1915.
1,228,124.
Patented May 29, 1917.
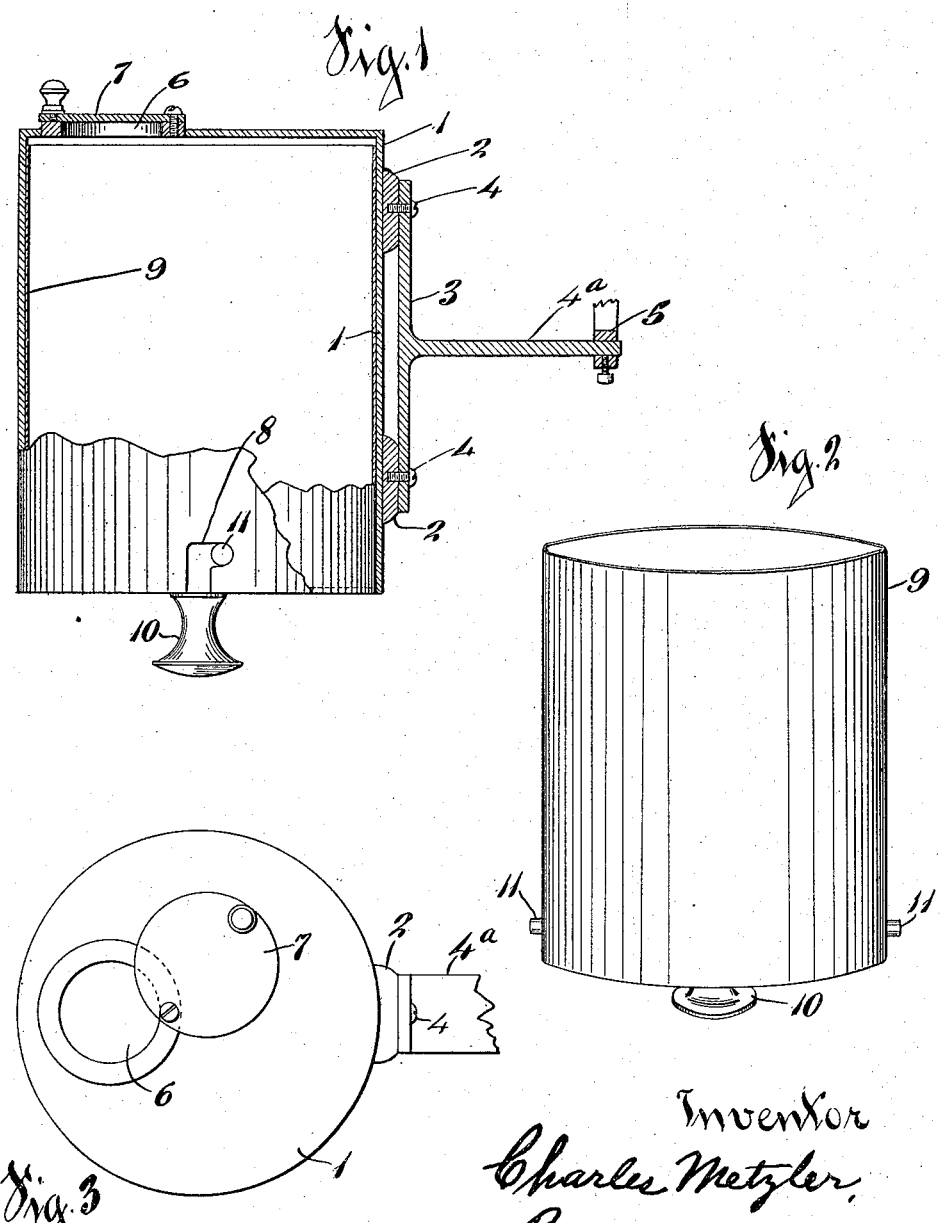

UNITED STATES PATENT OFFICE.

CHARLES METZLER, OF CINCINNATI, OHIO.

DENTAL-WASTE RECEIVER.

1,228,124.  Specification of Letters Patent.  Patented May 29, 1917.

Application filed October 19, 1915. Serial No. 56,792.

*To all whom it may concern:*

Be it known that I, CHARLES METZLER, a citizen of the United States, and a resident of Cincinnati, in the county of Hamilton and State of Ohio, have invented a certain new and useful Improvement in Dental-Waste Receivers, of which the following is a full, clear, and exact description, reference being had to the accompanying drawings, forming a part of this specification.

My invention relates to dental waste receivers, particularly to such as are designed to receive waste cotton.

The object of my invention is to provide a dental waste receiver of simple construction and neat appearance which is arranged to be attached to a dental stand or any other suitable and convenient fixture.

In the drawings:

Figure 1 is a central, vertical sectional view of my new waste receiver, a portion being shown in elevation.

Fig. 2 is a perspective of the cup of the said waste receiver.

Fig. 3 is a top view of my invention.

The numeral 1 indicates a cylindrical casing or cup. The said casing has on one side bosses 2 for the attachment of a bracket 3 by means of screws 4 as shown in Fig. 1 of the drawings. The bracket 3 has a horizontal stem 4ª which is designed to be inserted in the slot of a holder 5 which is secured to the dental stand or other suitable fixture. The casing 1 has at its top a round opening 6 and is provided with a pivotal cover 7 for said opening. The lower end of said casing is open and the lower edge is provided with bayonet slots 8 for the purpose hereinafter set forth. Adapted to fit inside of the casing 1 is a cylindrical cup 9, the upper end of which is open. The bottom of said cup has a handle 10. On opposite sides of the cup and near the bottom thereof, are studs 11 adapted to fit into and be secured by the bayonet slots 8 as shown in Fig. 1.

The nature and operation of my invention will be readily apparent to those skilled in the art to which the same appertains from the foregoing description. The casing 1 being secured in the holder 5 so that the opening extends downwardly, the cup 9 may be inserted therein, the studs 11 fitting in the bayonet slots 8 of the casing. A slight rotation of the cup secures the same in the casing. When thus secured, the cup is in position to receive dental waste, as for instance cotton, through the opening 6 in the top of the casing 1, the cover 7 being arranged normally to keep said opening closed. The handle 10 on the bottom of the cup furnishes a convenient mode for handling the same in its insertion or removal from the casing 1.

Having thus described my invention, what I claim as new and desire to secure by Letters Patent is:

A dental waste receiver comprising a cylindrical casing, a cup arranged to fit into said casing, studs near the bottom of said cup, bayonet slots in the bottom end of said cup arranged to receive said studs for temporarily securing said cup in said casing, an opening in the top of said casing over said cup for the insertion or removal of dental waste and a cover in said opening pivotally mounted on said casing.

CHARLES METZLER.

Witnesses:
 OLIVER W. SHARMAN,
 ARTHUR H. EWALD.

Copies of this patent may be obtained for five cents each, by addressing the "Commissioner of Patents, Washington, D. C."